(12) United States Patent
Lund et al.

(10) Patent No.: US 12,740,499 B2
(45) Date of Patent: Sep. 22, 2026

(54) AGRICULTURAL IMPLEMENT WITH SENSORS FOR MEASURING SOIL PROPERTIES

(71) Applicant: Veris Technologies, Inc., Salina, KS (US)

(72) Inventors: Eric Lund, Salina, KS (US); Kyle Jensen, Salina, KS (US); Chase Maxton, Salina, KS (US); Tyler Lund, Salina, KS (US); Paul Drummond, Minneapolis, KS (US)

(73) Assignee: Veris Technologies, Inc., Salina, KS (US)

( * ) Notice: Subject to any disclaimer, the term of this patent is extended or adjusted under 35 U.S.C. 154(b) by 412 days.

(21) Appl. No.: 18/230,160

(22) Filed: Aug. 3, 2023

(65) Prior Publication Data

US 2024/0040953 A1 Feb. 8, 2024

Related U.S. Application Data

(60) Provisional application No. 63/394,763, filed on Aug. 3, 2022.

(51) Int. Cl.
*A01B 76/00* (2006.01)
*A01B 15/16* (2006.01)

(52) U.S. Cl.
CPC .............. *A01B 76/00* (2013.01); *A01B 15/16* (2013.01)

(58) Field of Classification Search
CPC ................................ A01B 15/16; A01B 76/00
See application file for complete search history.

(56) References Cited

U.S. PATENT DOCUMENTS

| | | | | |
|---|---|---|---|---|
| 1,862,304 A * | 6/1932 | Grams | A01B 33/144 172/544 |
| 10,729,052 B1 * | 8/2020 | Lund | A01C 5/062 |
| 2018/0139891 A1 * | 5/2018 | Gerber | A01B 49/02 |
| 2019/0000002 A1 * | 1/2019 | Steinlage | A01B 29/048 |
| 2019/0208698 A1 * | 7/2019 | Maxton | G01N 27/223 |

FOREIGN PATENT DOCUMENTS

| | | | |
|---|---|---|---|
| EP | 1300060 A1 * | 4/2003 | A01B 49/027 |
| EP | 2415336 A1 * | 2/2012 | A01B 35/24 |
| EP | 2517542 A2 * | 10/2012 | A01B 49/02 |
| FR | 2923348 A1 * | 5/2009 | A01C 5/068 |

* cited by examiner

*Primary Examiner* — Matthew R Buck
(74) *Attorney, Agent, or Firm* — Jeffrey L. Thompson; Thompson Law, P.A.

(57) ABSTRACT

An agricultural implement with various sensors for measuring properties of soil while performing normal planting or other operations. The sensors include a plurality of flexible tine assemblies used as electrodes for measuring soil EC. The flexible tine assemblies each have a lower end arranged to contact soil, and an upper end with a coil spring configuration attached to an electrically isolated support structure. The coil spring configuration allows the flexible tine to flex rearwardly to shed residue and clear obstructions. The flexible tine is arranged behind a soil engaging tool, such as an opener assembly or a residue clearing device, with the lower end contacting soil exposed by the soil engaging tool. Other soil sensors on the implement include sensor modules positioned in furrows behind the opener assemblies, and non-contact optical sensors arranged to measure reflectance of soil exposed by the opener assemblies.

24 Claims, 17 Drawing Sheets

AGRICULTURAL IMPLEMENT WITH SENSORS FOR MEASURING SOIL PROPERTIES

RELATED APPLICATIONS

This application claims the benefit of U.S. Provisional Patent Application No. 63/394,763 filed on Aug. 3, 2022, the contents of which are incorporated herein by reference.

BACKGROUND OF THE INVENTION

Field of the Invention

The present invention relates generally to methods and systems for measuring soil properties in an agricultural field, and in particular, to agricultural implements with sensors for measuring soil properties.

SUMMARY OF THE INVENTION

An agricultural implement is provided with various sensors for measuring properties of soil while performing normal planting, tillage or other operations. The sensors include a plurality of flexible tine assemblies used as electrodes for measuring soil EC. The flexible tine assemblies each have a lower end arranged to contact soil, and an upper end with a coil spring configuration attached to an electrically isolated support structure. The coil spring configuration allows the flexible tine to flex rearwardly to shed residue and clear obstructions. The flexible tine is arranged behind a soil engaging tool, such as an opener assembly or a residue clearing device, with the lower end contacting soil exposed by the soil engaging tool. Other soil sensors on the implement include sensor modules positioned in furrows behind opener assemblies, and non-contact optical sensors arranged to measure reflectance of soil exposed by an opener assembly before the soil is closed by a closing wheel assembly.

The present invention has several objects that are met by the various embodiments and features described herein. For example, one object of the present invention is to provide a row unit with sensors that can be used to measure soil properties while performing other field operations.

A further object of the present invention is to provide an implement that can be used in various soil and residue conditions for measuring soil properties.

A further object of the present invention is to provide a row crop implement with row units equipped with electrically isolated flexible tines for measuring soil EC in soil exposed by a soil engaging tool.

A further object of the present invention is to provide a flexible tine assembly with an adjustable mounting system for measuring soil EC.

A further object of the present invention is to provide a row crop implement with a variety of sensors for measuring soil properties, including flexible tines for measuring soil EC, and sensor modules positioned in furrows created by opener assemblies for measuring one or a combination of soil moisture, soil temperature and soil reflectance.

A further object of the present invention is to provide a flexible tine assembly behind a coulter for measuring soil EC in exposed soil in the slot created by the coulter.

A further object of the present invention is to provide a non-contact soil sensor system that measures soil reflectance on a residue-cleared zone of fresh soil behind an opener assembly and ahead of a closing assembly.

A further object of the present invention is to provide a non-contact soil sensor system that measures how much crop residue is left on a field following a field operation, such as planting.

A further object of the present invention is to provide a non-contact soil sensor system that measures residue present in a furrow during planting.

A further object of the present invention is to provide an implement with a plurality of in-furrow sensors following behind opener assemblies for measuring soil EC, soil organic matter, and/or soil moisture.

Numerous other objects of the present invention will be apparent to those skilled in this art from the following description wherein there is shown and described embodiments of the present invention, simply by way of illustration of some of the modes best suited to carry out the invention. As will be realized, the invention is capable of other different embodiments, and its several details are capable of modification in various obvious aspects without departing from the invention. Accordingly, the drawings and description should be regarded as illustrative in nature and not restrictive.

BRIEF DESCRIPTION OF THE DRAWINGS

The present invention will become more clearly appreciated as the disclosure of the present invention is made with reference to the accompanying drawings. In the drawings.

DETAILED DESCRIPTION OF THE INVENTION

Embodiments of agricultural implements with sensors for measuring soil properties according to the present invention will be described in detail with reference to FIGS. 1 to 16 of the accompanying drawings.

Figure 1:
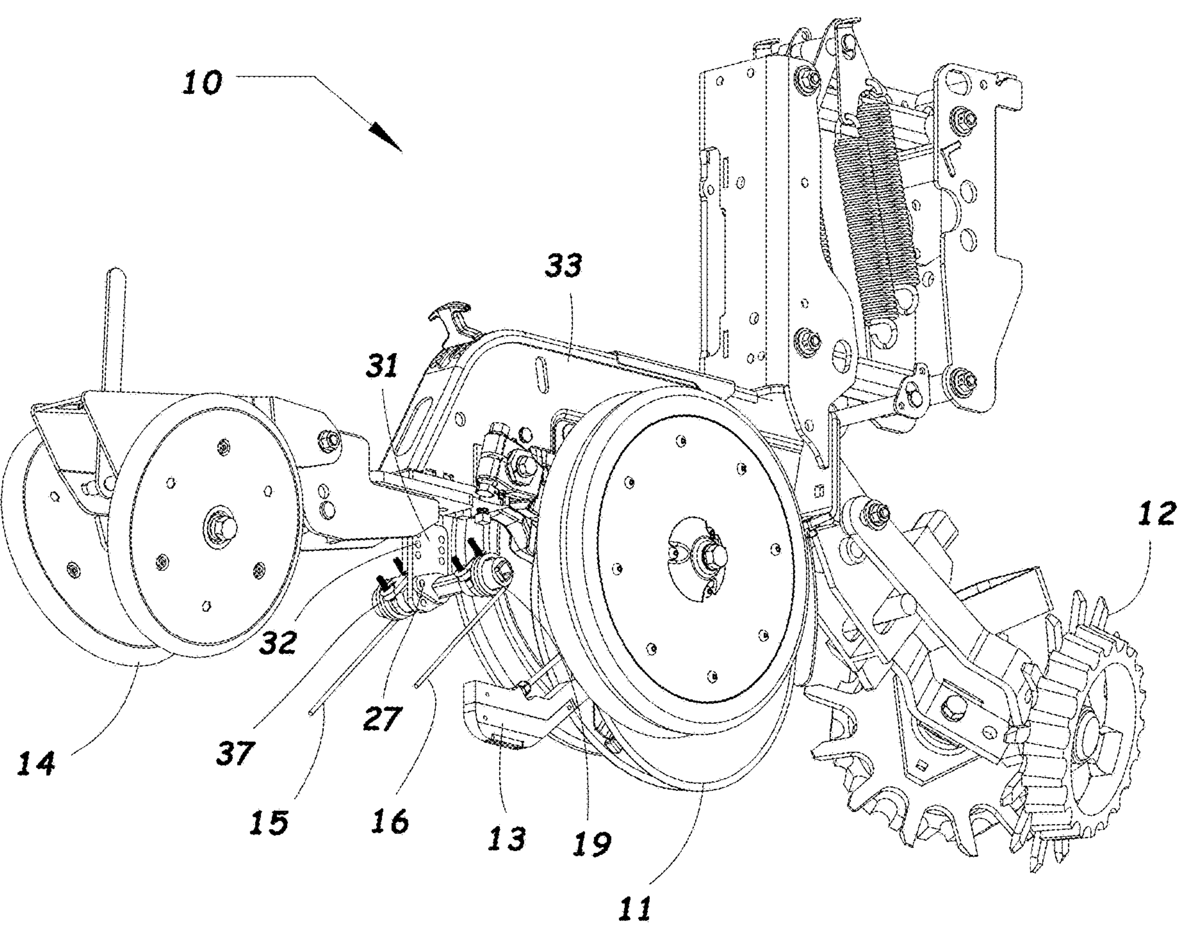
FIG. 1 is a perspective view of a row unit according to the present invention equipped with a pair of soil EC tines arranged behind an opener assembly along with a sensor module positioned in the furrow created by the opener assembly.
Figure 1A:
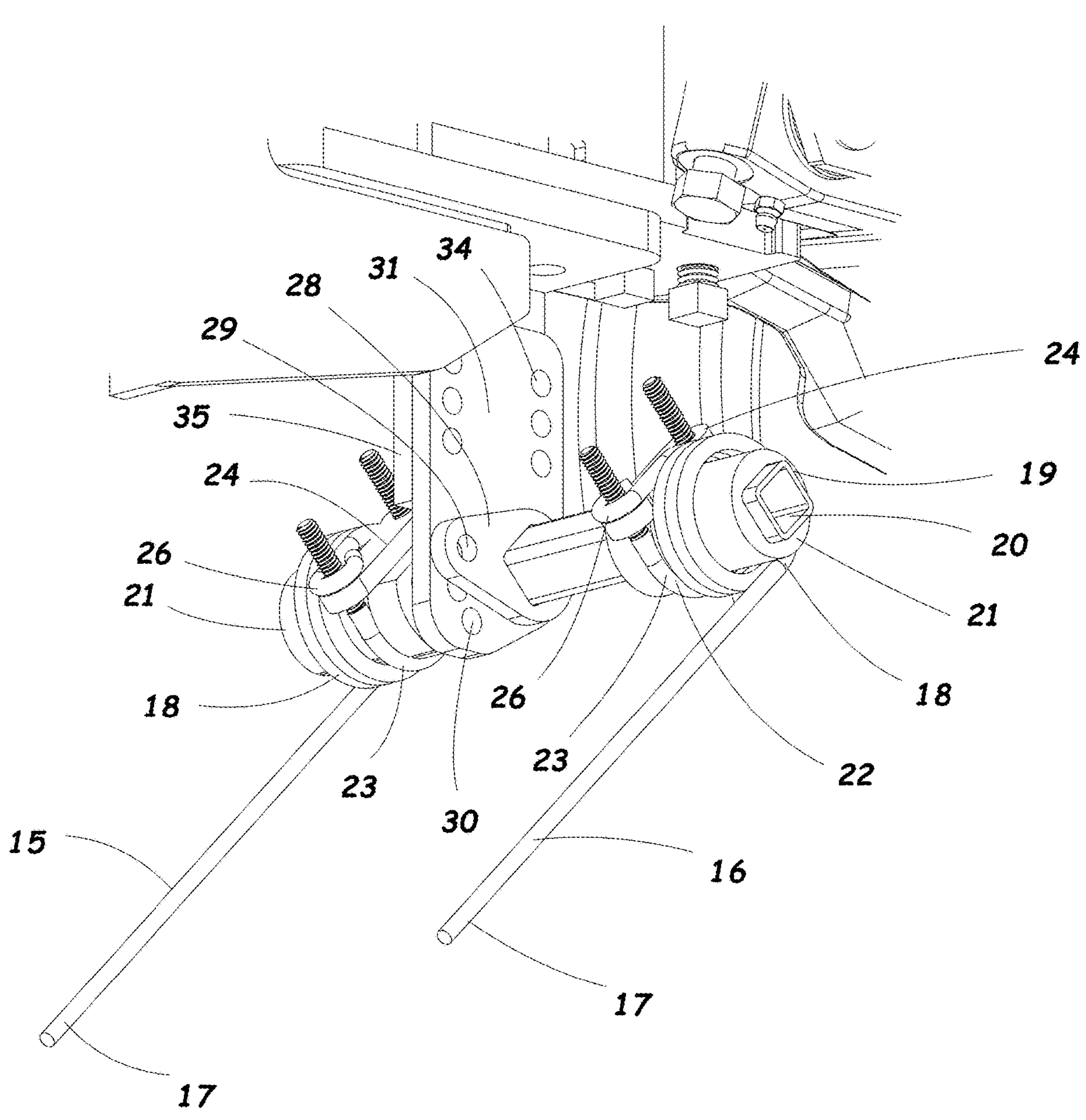
FIG. 1A is a detail view of the mounting system for the soil EC tines in the row unit of FIG. 1.

A row unit 10 equipped with soil sensors according to a first embodiment of the present invention is illustrated in FIG. 1. The row unit 10 includes an opener assembly 11 for creating a furrow F, a residue clearing assembly 12 for clearing residue from in front of the opener assembly 11, a sensor module 13 positioned in the furrow F created by the opener assembly 11, and a closing wheel assembly 14 for closing the furrow F. The row unit 10 can be a planter row unit, in which case a seed dispensing mechanism (not shown) would be provided to dispense seeds into the furrow F created by the opener assembly 11.

The sensor module 13 can be used to measure one or a combination of soil properties, such as soil moisture, soil temperature and soil reflectance. The sensor module 13 is a furrow sensor assembly that operates in the furrow F created by the opener assembly 11. The sensor module 13 can also serve as a seed firmer to press seeds into the bottom of the furrow F behind the opener assembly 11, if the row unit 10 is a planter row unit with seed dispensing into the furrow F. Alternatively, the sensor module 13 can be mounted to maintain a gap between the bottom edge of the sensor module 13 and the bottom of the furrow F to avoid contact between the sensor module 13 and the seed in the bottom of the furrow F, as explained further below.

The row unit 10 also includes first and second metal tine assemblies 15, 16 positioned behind the opener assembly 11 and ahead of the closing wheel assembly 14. The tine assemblies 15, 16 serve as soil-contacting electrodes in an array of four or more electrodes for measuring soil EC. The metal tine assemblies 15, 16 each include a first portion 17 having a lower end arranged to contact soil, and a second portion 18 having a coil spring configuration mounted to an electrically isolated support structure 19.

The support structure 19 includes a laterally extending tubular member 20, first and second non-conductive sleeves 21 installed over respective portions of the tubular member 20, and clamps 22 for securing the second portions 18 of the tine assemblies 15, 16 to the non-conductive sleeves 21. The clamps 22 each include a U-bolt 23, a mounting plate 24, and a pair of threaded nuts for tightening the U-bolt 23. The second portions 18 of the metal tine assemblies 15, 16 each have a free end bent 26 into a loop, placed over a threaded portion of the U-bolt 23 and held in place by one of the threaded nuts 25.

Each tine assembly 15, 16 is mounted so that the first portion 17 extends downwardly and rearwardly from the second portion 18. The first portion 17 of the tine assembly 15, 16 can flex rearwardly to shed residue and clear obstructions by twisting the coil spring configuration of the second portion 18. The first portions 17 of the tine assemblies 15, 16 are arranged to contact the soil in or adjacent to the furrow F behind the opener assembly 11, thereby providing firm soil contact and good soil EC measurements. In the illustrated embodiment, the first and second flexible tines 15, 16 have respective lower ends 17 that contact soil on right and left sides of the furrow F behind the opener assembly 11.

The support structure 19 has a first adjustment system 27 for adjusting an angular position of the tine assemblies 15, 16 about a lateral axis concentric with the coil spring configuration of the second portions 18 of the tine assemblies 15, 16. The first adjustment system 27 includes a flange 28 having a bolt hole 29 that can be selectively aligned with a plurality of mounting holes 30 on a support plate 31 for receiving a threaded fastener or pin member for locking the support structure 19 in a selected angular position.

The support structure 19 has a second adjustment system 32 for adjusting a vertical position of the tine assemblies 15, 16 relative to the row unit subframe 33. The second adjustment system 32 includes the first support plate 31 having a first plurality of mounting holes 34, and a second support plate 35 having a second plurality of mounting holes. The first mounting holes 34 in the first support plate 31 can be aligned with the second mounting holes in the second support plate 35 for receiving threaded fasteners or pin members for locking the support structure 19 in a selected vertical position.

The support structure 19 also has a third adjustment system 37 that allows the tine assemblies 15, 16 to be laterally adjusted by loosening the clamps 22 and sliding the tine assemblies 15, 16 along the laterally extending tubular members 20.

Figure 2:
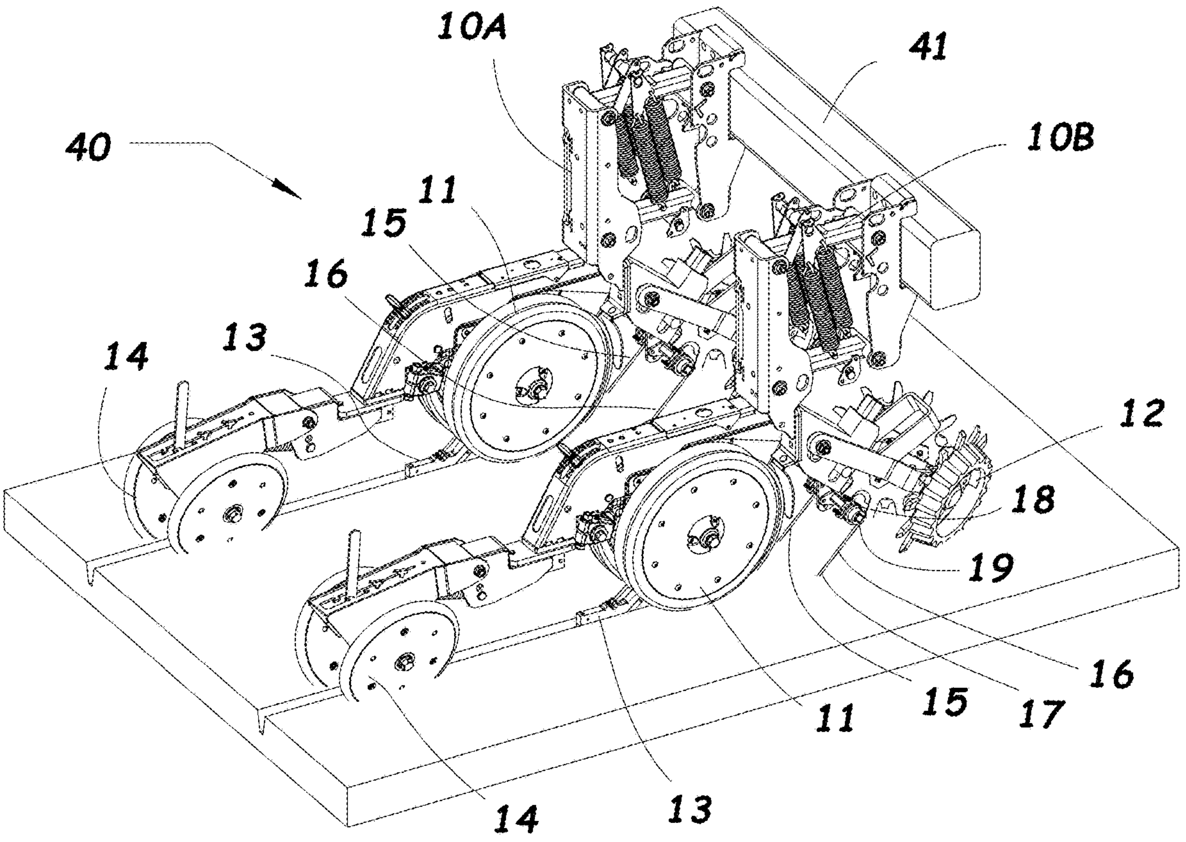
FIG. 2 is a perspective view of a pair of row units according to the present invention equipped with pairs of soil EC tines arranged behind residue clearing devices ahead of the opener assemblies, and sensor modules positioned in furrows created by the opener assemblies.

A row crop implement 40 equipped with sensors according to a second embodiment of the present invention is illustrated in FIG. 2. The same reference numerals will be used in the drawings to designate common features between the second embodiment and the first embodiment described above. In the second embodiment, first and second row units 10A, 10B are attached to a tool bar 41, and each row unit 10A, 10B has soil engaging tools and sensors for measuring soil properties. The soil engaging tools include residue clearing assemblies 12 at the front of the row units 10A, 10B, and opener assemblies 11 arranged to follow behind the residue clearing assemblies 12. The opener assemblies 11 can be double disk planter openers as shown in FIG. 2, or single disk openers for seeders.

The soil sensors include sensor modules 13 positioned in the furrows F created by the opener assemblies 11. The sensor modules 13 can be used to measure one or a combination of soil moisture, soil temperature and soil reflectance. The soil reflectance measurement can be used to determine soil organic matter content, among other things.

The sensor module 13 is a furrow sensor assembly that operates in the furrow F created by the opener assembly 11.

The row units 10A, 10B each have first and second metal tine assemblies 15, 16 positioned behind the residue clearing assemblies 12 and ahead of the opener assemblies 11. The tine assemblies 15, 16 serve as soil-contacting electrodes in an array for measuring soil EC. The metal tine assemblies 15, 16 each include a first portion 17 having a lower end arranged to contact soil, and a second portion 18 having a coil spring configuration mounted to an electrically isolated support structure 19. The support structure 19 can be in substantially the same form as described above in connection with the embodiment illustrated in FIG. 1.

In the embodiment shown in FIG. 2, the tines 15, 16 for measuring soil EC are positioned so that their lower ends 17 contact soil on right and left sides of the paths cleared by the residue clearing assemblies 12 at the front of each row unit 10A, 10B.

Figure 3:
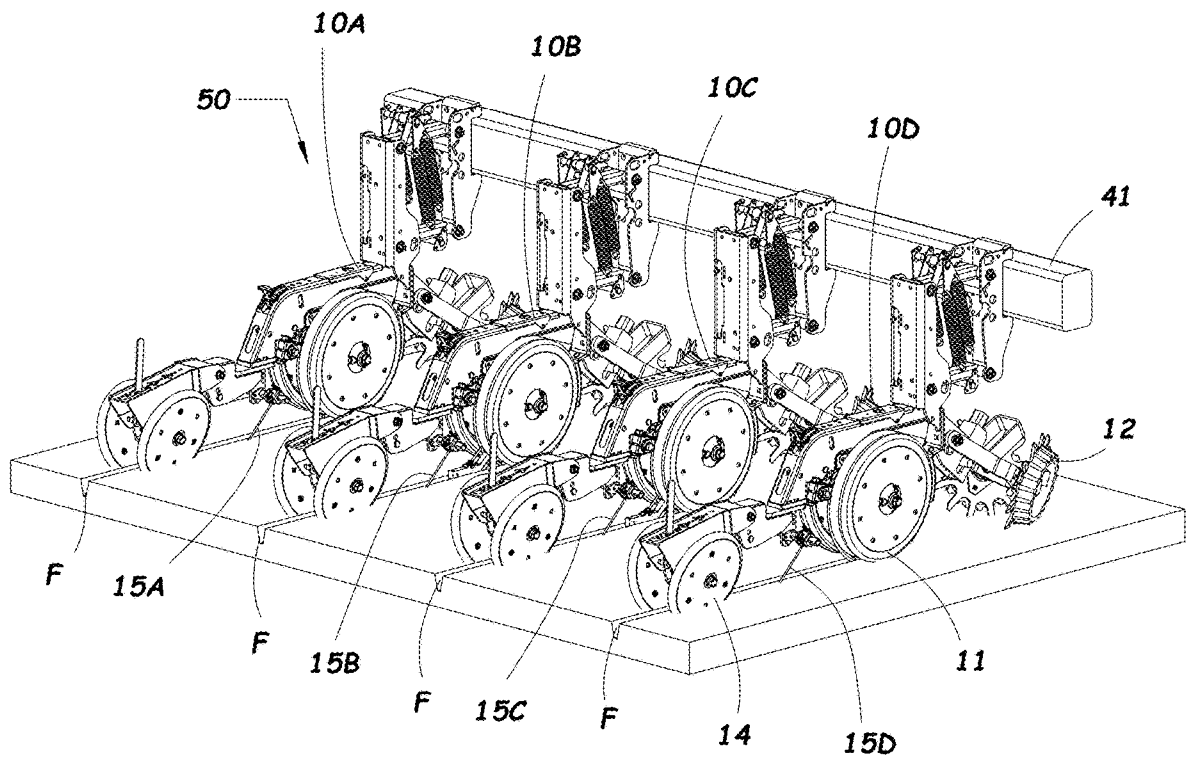
FIG. 3 is a perspective view of an implement according to the present invention with four row units equipped with sensors, including single soil EC tines arranged behind each opener assembly, and sensor modules positioned in two of the furrows created by the opener assemblies.

A row crop implement 50 equipped with sensors according to a third embodiment of the present invention is illustrated in FIG. 3. The same reference numerals will be used in the drawings to designate common features between the third embodiment and the first and second embodiments described above. In the third embodiment, four row units 10A, 10B, 10C, 10D are attached to a tool bar 41, and each row unit 10A-10D has soil engaging tools and at least one sensor for measuring soil properties. The soil engaging tools include residue clearing assemblies 12 at the front of the row units 10A-10D, and opener assemblies 11 arranged to follow behind the residue clearing assemblies 12.

The soil sensors include sensor modules 13 positioned in the furrows F created by the opener assemblies 11 of two of the row units 10B, 10C. As in the FIG. 2 embodiment, the sensor modules 13 can be used to measure one or a combination of soil moisture, soil temperature and soil reflectance. The soil reflectance measurement can be used to determine soil organic matter content, among other things.

The implement 50 shown in FIG. 3 differs from the implement 40 shown in FIG. 2 in that the flexible metal tines 15A, 15B, 15C, 15D are positioned behind each of the opener assemblies 11 instead of in front thereof, and in that only one metal tine per row is provided in the FIG. 3 embodiment. The single metal tine 15A-15D of each of the four row units 10A-10D serves as a soil-contacting electrode in an array of aligned electrodes for measuring soil EC. By using a single metal electrode on each row unit 10A-10D, the electrode array 15A-15D in the FIG. 3 embodiment spans the width of four rows, instead of just two rows as in the implement 40 in the FIG. 2 embodiment. The larger span of the electrode array 15A-15D in the implement 50 of the FIG. 3 embodiment will allow the implement 50 to collect soil EC measurements at a different depth than the implement 40 in the FIG. 2 embodiment.

Figure 4:
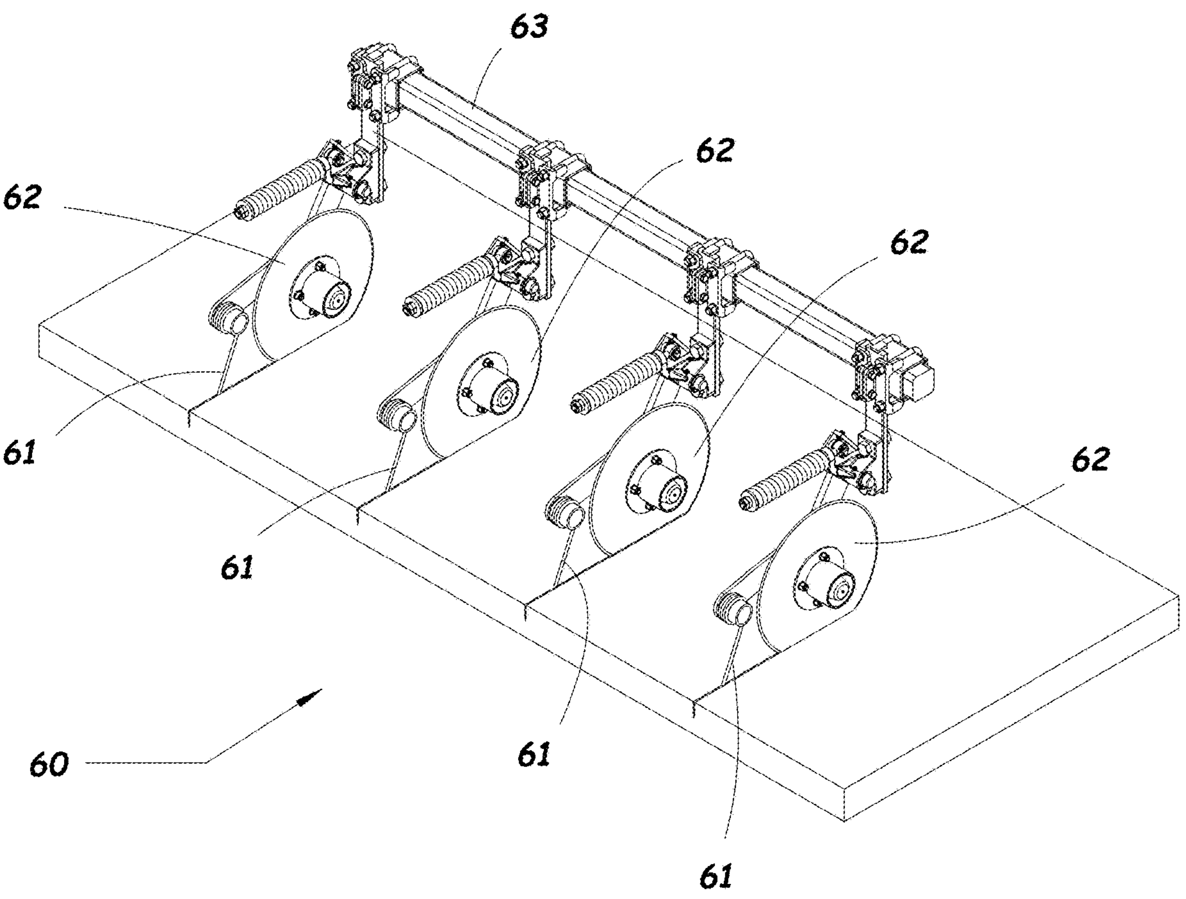
FIG. 4 is a perspective view of an implement having four coulters mounted to a tool bar, with flexible tines that follow behind the coulters to engage soil exposed by the coulters to measure soil EC.

A coulter implement 60 equipped with flexible metal tines 61 for measuring soil EC according to a fourth embodiment of the present invention is illustrated in FIG. 4. The implement 60 includes four coulters 62 mounted to a tool bar 63, with flexible metal tines 61 that follow behind the coulters 62. The metal tines 61 engage soil exposed by the coulters 62 and serve as an array of electrodes for measuring soil EC.

The metal tines 61 are adjustable vertically relative to the coulters 62 to accommodate different soil and residue conditions. The coulters 62 cut through any residue and create a slot as the implement 60 crosses a field, and the metal tines 61 are positioned to run in the slot created by the coulters 62.

Figure 5:
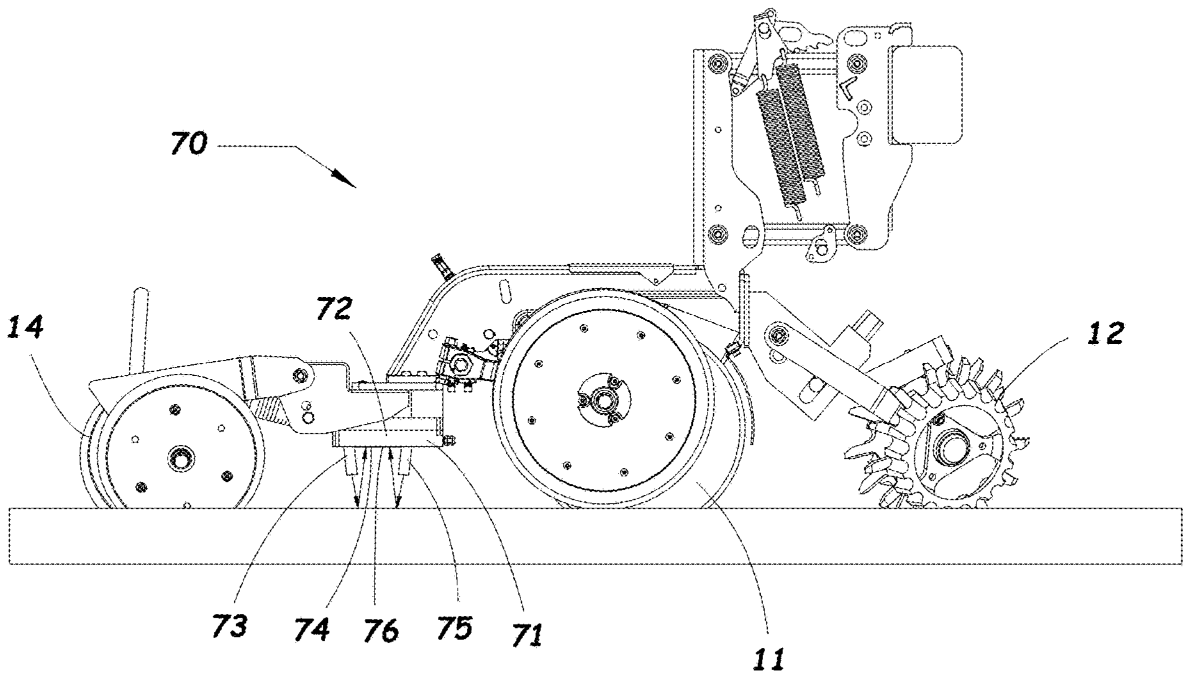
FIG. 5 is an elevation view of a row unit with a non-contact sensor for collecting measurements in a residue-cleared zone of fresh soil behind an opener assembly.

A row unit 70 with a non-contact sensor module 71 for collecting measurements in a residue-cleared zone of soil behind an opener assembly 11 according to a fifth embodiment of the present invention is illustrated in FIG. 5. The row unit 70 includes an opener assembly 11 for creating a furrow F, a residue clearing assembly 12 for clearing residue from in front of the opener assembly 11, the non-contact sensor module 71 positioned above the furrow F behind the opener assembly 11, and a closing wheel assembly 14 for closing the furrow F. The row unit 70 can be a planter row unit, in which case a seed dispensing mechanism (not shown) would be provided to dispense seeds into the furrow F created by the opener assembly 11. The row unit 70 can also be a tillage row unit, fertilizer applicator row unit, or other farm implement that has soil engaging tools for clearing residue and creating a fresh soil scene.

The non-contact sensor module 71 in the embodiment illustrated in FIG. 5 includes a non-contact optical sensor 72 for measuring soil reflectance in the freshly exposed soil between the opener assembly 11 and the closing wheel assembly 14. The reflectance measurement is taken before the furrow F is closed by the closing wheel assembly 14.

The benefits of non-contact sensing are: (1) fewer issues with mud, rocks and other complexities encountered when sensors contact soil, and (2) reduced operating/wear costs due to contact with abrasive soil. For an optical sensor to see soil and not weeds, crop or crop residue, the soil scene should be cleared so that it contains only soil, or mostly soil. This approach can be effective in conventional tilled fields, or by mounting the sensor in conjunction with a component on a field implement that is creating an acceptable soil scene. For example, row cleaners 12 or opener assemblies 11 on a planter create an acceptable soil scene for non-contact sensing during normal planting operations.

The non-contact optical sensor 72 includes a first LED light source 73 arranged to emit light at a first wavelength toward the soil exposed by the opener assembly 11, and a reflectance sensor 74 arranged to measure light reflected off the soil from the first light source 73. The non-contact sensor 73 also includes a second LED light source 75 arranged to emit light at a second wavelength toward the soil exposed by the opener assembly 11, and a reflectance sensor 76 arranged to measure light reflected off the soil from the second light source 75. The multiple wavelengths permit estimating soil moisture by using an index of optical values, and calculating the delta (i.e., the change in values at different wavelengths) to determine those that respond more to soil moisture differences than others.

Figure 7:
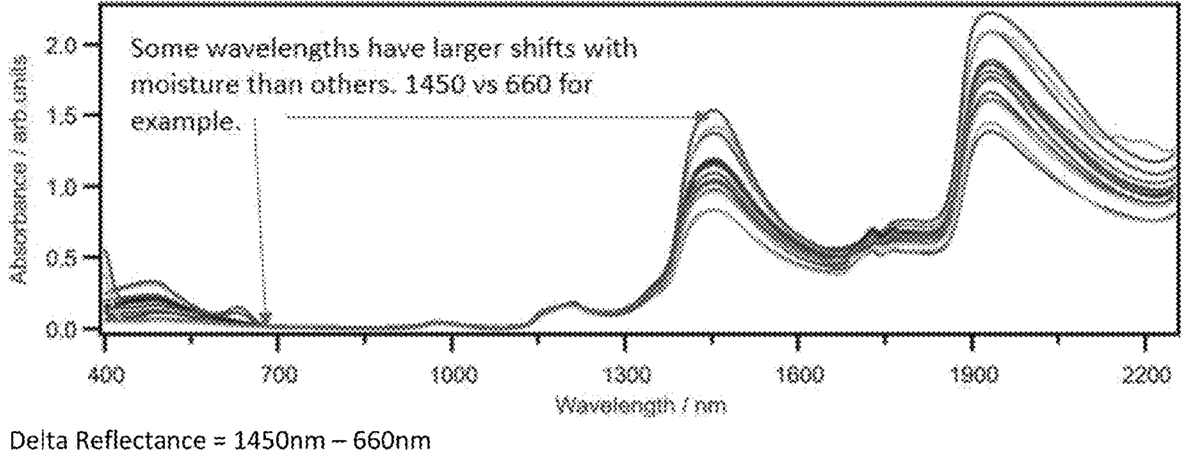
FIG. 7 is a graph showing a spectra of soil with different moisture levels.

FIG. 7 shows a spectra of soil with different moisture levels. The delta between the change in values at each of these wavelengths can be correlated with the moisture levels between the soils. A linear regression is developed using known soil moisture contents and the delta reflectance to calibrate the response to soil moisture.

A microprocessor is used to estimate soil moisture and other soil properties on-the-go by comparing an index of optical values to the reflectance data provided by the reflectance sensors 74, 76 for each of the first and second wavelengths. For example, the non-contact sensor 72 can be used to measure soil organic matter, soil temperature and soil moisture, and also to modify or calibrate readings from other sensors being used in tandem with the non-contact sensor 72.

Figure 6:
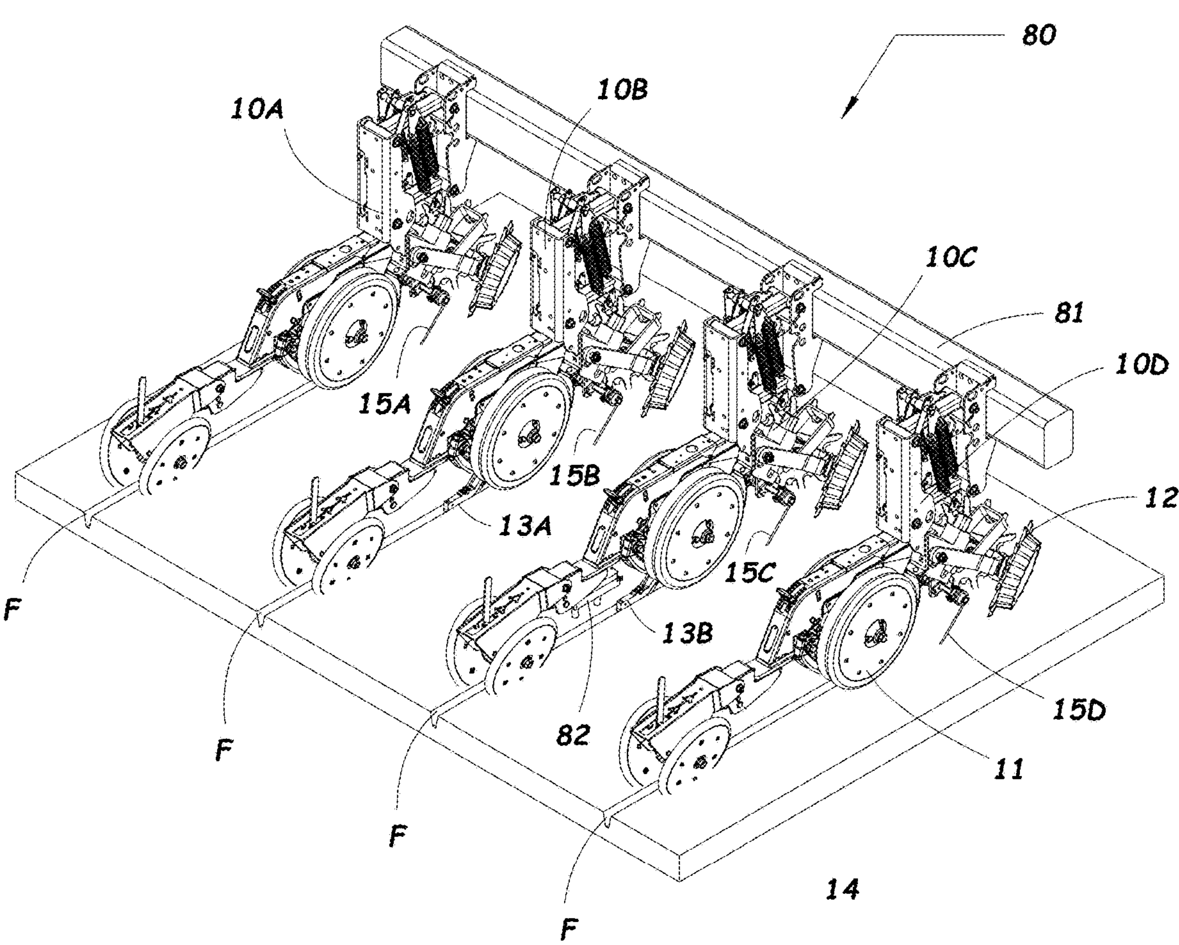
FIG. 6 is a perspective view of an implement having four row units equipped with a combination of contact sensors and non-contact sensors according to the present invention.

A row crop implement 80 having a plurality of row units equipped with a combination of contact sensors and non-contact sensors according to a sixth embodiment of the present invention is illustrated in FIG. 6. The same reference numerals will be used in the drawings to designate common features between the sixth embodiment and the first, second and third embodiments described above. In the implement 80 of the FIG. 6 embodiment, four row units 10A-10D are attached to a tool bar 81, and each row unit 10A-10D has soil engaging tools and at least one sensor for measuring soil properties. The soil engaging tools include residue clearing assemblies 12 at the front of the row units 10A-10D, and opener assemblies 11 arranged to follow behind the residue clearing assemblies 12.

The soil sensors in the FIG. 6 embodiment include a non-contact optical sensor 82 associated with one of the row units 10C, similar to the non-contact sensor described above and illustrated in FIG. 5. The non-contact sensor 82 is used to measure soil reflectance in the exposed soil between the opener assembly 11 and the closing wheel assembly 14, before the soil is closed by the closing wheel assembly 14.

The sensors in the FIG. 6 embodiment also include sensor modules 13A, 13B positioned in the furrows F created by the opener assemblies 11 of two of the row units 10B, 10C. As in the embodiments of FIGS. 2 and 3, the sensor modules 13A, 13B can be used to measure one or a combination of soil moisture, soil temperature and soil reflectance. The soil reflectance measurement can be used to determine soil organic matter content, among other things.

The implement 80 shown in FIG. 6 also includes an array of flexible metal tines 15A-15D that serve as an array of aligned electrodes for measuring soil EC. The metal tines 15A-15D are arranged with one metal tine per row, for a total of four soil-contacting tines 15A-15D across the width of the implement 80, or across a portion of the width of the implement 80. The metal tines 15A-15D are positioned between the residue clearing assemblies 12 and the opener assemblies 11. The metal tines 15A-15D are electrically isolated so that soil EC measurements can be collected in a known manner.

Figure 8:
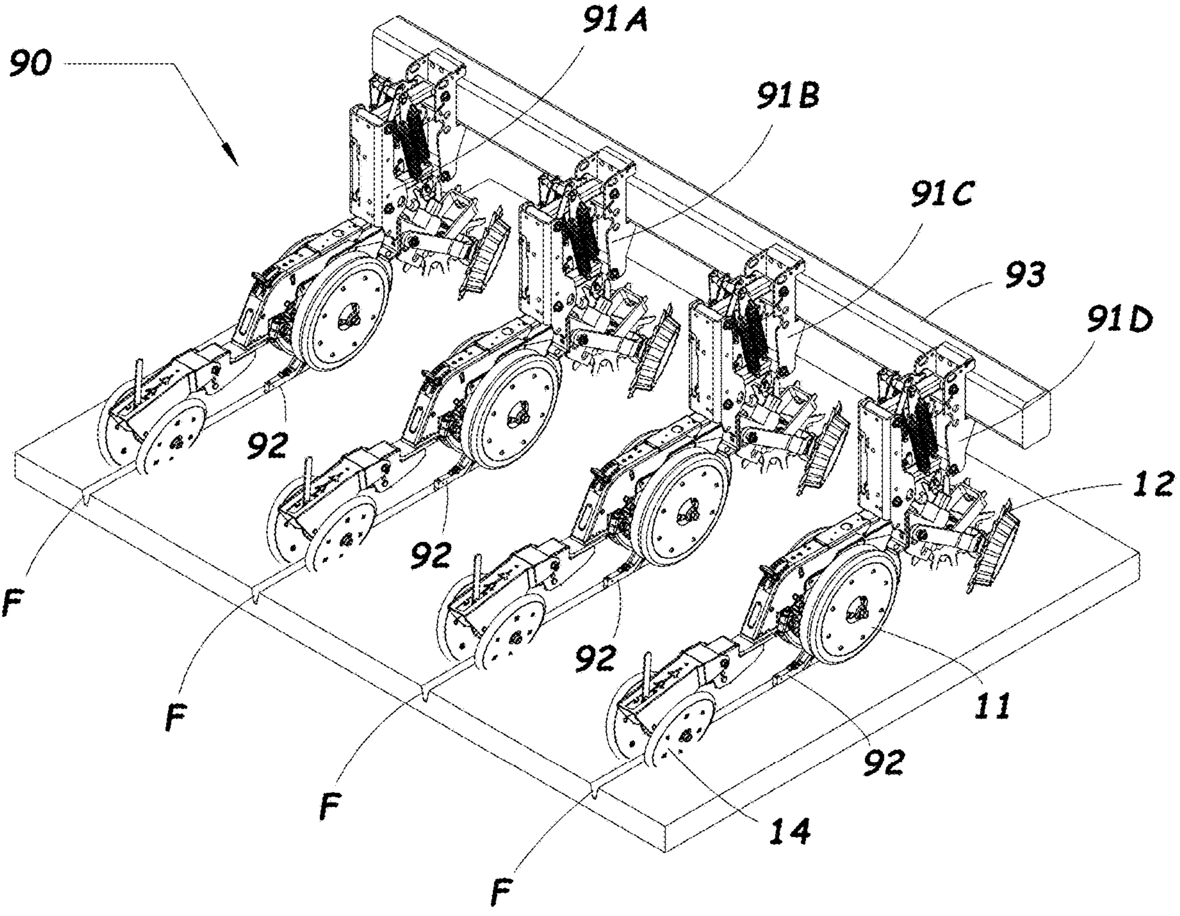
FIG. 8 is a perspective view of an implement having four row units equipped with sensor modules positioned in the furrows created by the opener assemblies.

A row crop implement 90 having a plurality of row units 91A-91D equipped with a combination of in-furrow contact sensors 92 according to a seventh embodiment of the present invention is illustrated in FIG. 8. In the FIG. 8 embodiment, four adjacent row units 91A-91D are attached to a tool bar 93, and each row unit 91A-91D has soil engaging tools and at least one sensor for measuring soil properties. The soil engaging tools include residue clearing assemblies 12 at the front of the row units 91A-91D, opener assemblies 11 arranged to follow behind the residue clearing assemblies 12, and closing wheel assemblies 14 arranged to follow behind the opener assemblies 11.

The soil sensors 92 in the FIG. 8 embodiment include sensor modules positioned in the furrows F created by the opener assemblies 11 of the four row units 91A-91D. The sensor modules each have a metal EC contact that contacts soil in the furrow F and serves as an electrode in an array of aligned electrodes for measuring soil EC. The metal EC contacts are electrically isolated from each other so that soil EC measurements can be collected in a known manner.

In-furrow sensor modules 92 suitable for use in the FIG. 8 embodiment described above are illustrated in FIGS. 9 and 10. The sensor modules 92 are configured for attachment to the row units 91A-91D behind the opener assemblies 11 and are shaped to fit into the furrows F created by the opener assemblies 11. The sensor modules 92 are furrow sensor assemblies that operate in the furrows F created by the opener assemblies 11.

Figure 9:
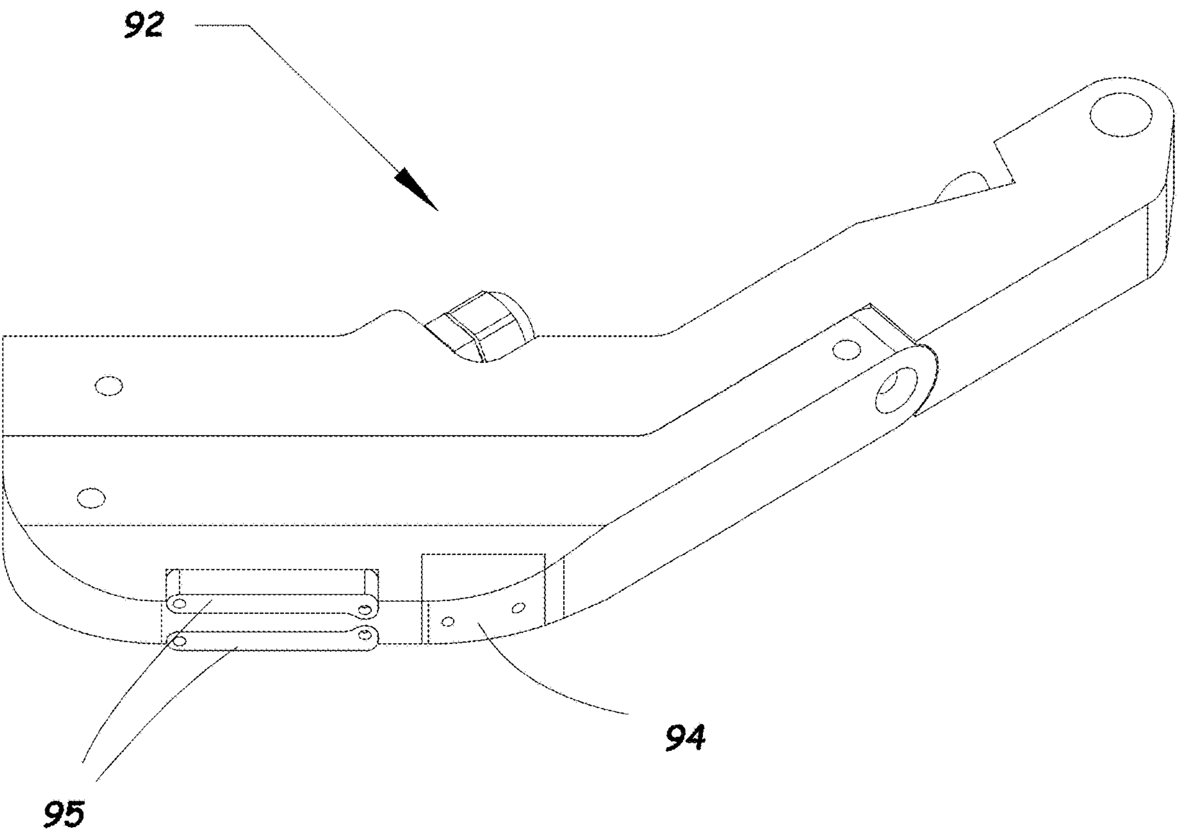
FIG. 9 is a perspective view of an in-furrow sensor module having a soil EC contact at a front portion of the module and a pair of soil moisture contacts positioned behind the soil EC contact.
Figure 10:
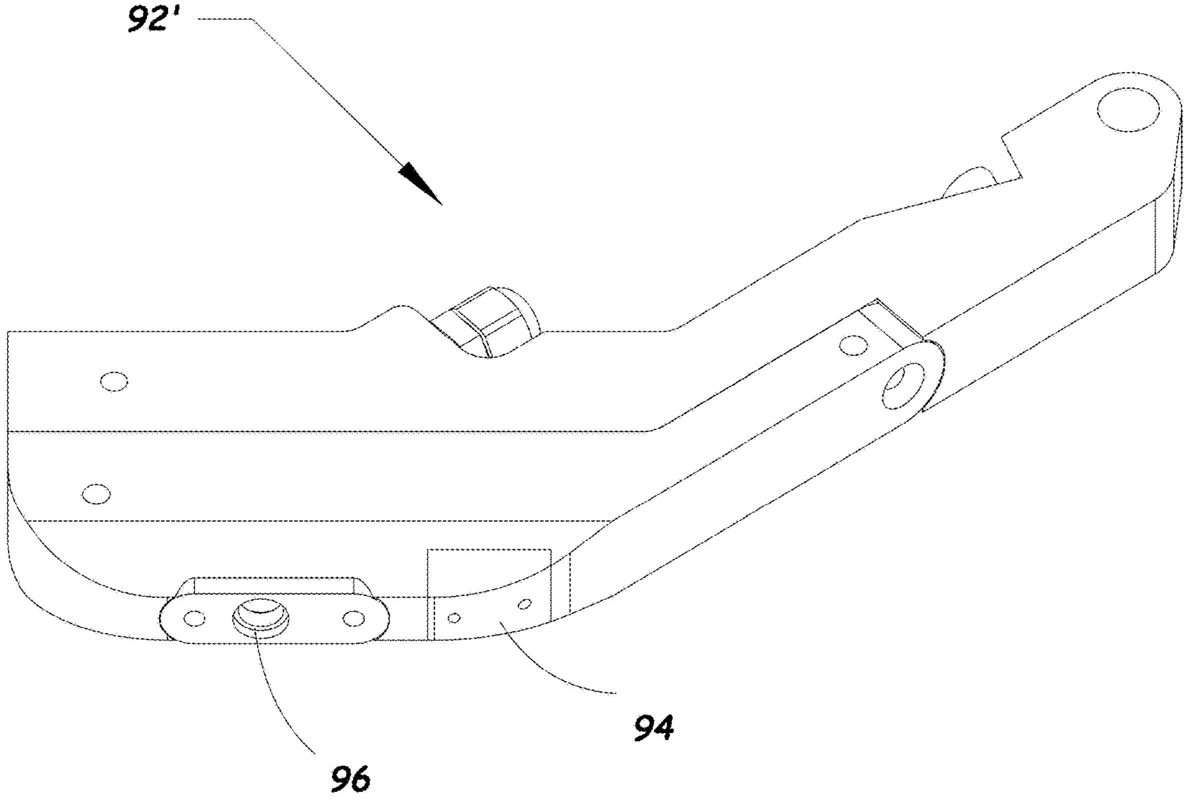
FIG. 10 is a perspective view of an in-furrow sensor module having a soil EC contact at a front portion of the module and a soil optical sensor positioned behind the soil EC contact.

The sensor modules 92, 92' shown in FIGS. 9 and 10 each include an EC contact 94 positioned at the leading face for contacting the soil in the bottom of the furrow F. The EC contacts 94 are electrically isolated from the other parts of the sensor modules 92 so that they can serve as electrodes in an array of electrodes for sensing soil EC.

As shown in the FIG. 9 embodiment, the sensor module 92 can also include a pair of contacts 95 for measuring soil moisture. The soil moisture sensor contacts 95 protrude from a lower surface of the sensor module 92 behind the soil EC contact 94.

As shown in the FIG. 10 embodiment, the sensor module 92' can also include an optical sensor 96 for measuring soil reflectance to determine soil organic matter. The optical sensor 96 is positioned behind the soil EC contact 94.

The sensor modules 92, 92' shown in FIGS. 9 and 10 can be used together with similar sensor modules that have the soil EC contacts 94 together with other sensors, such as a soil temperature sensor, or sensor modules that only have soil EC contacts 94. For example, four sensor modules 92, 92' can be arranged on four adjacent row units, with one of the sensor modules 92 having a soil EC contact 94 combined with soil moisture contacts 95 (FIG. 9), one of the sensor modules 92' having a soil EC contact 94 combined with a soil optical sensor 96 (FIG. 10), one of the sensor modules having a soil EC contact 94 combined with a soil temperature contact, and the other sensor module providing the fourth soil EC contact 94 for measuring soil EC.

Figure 11:
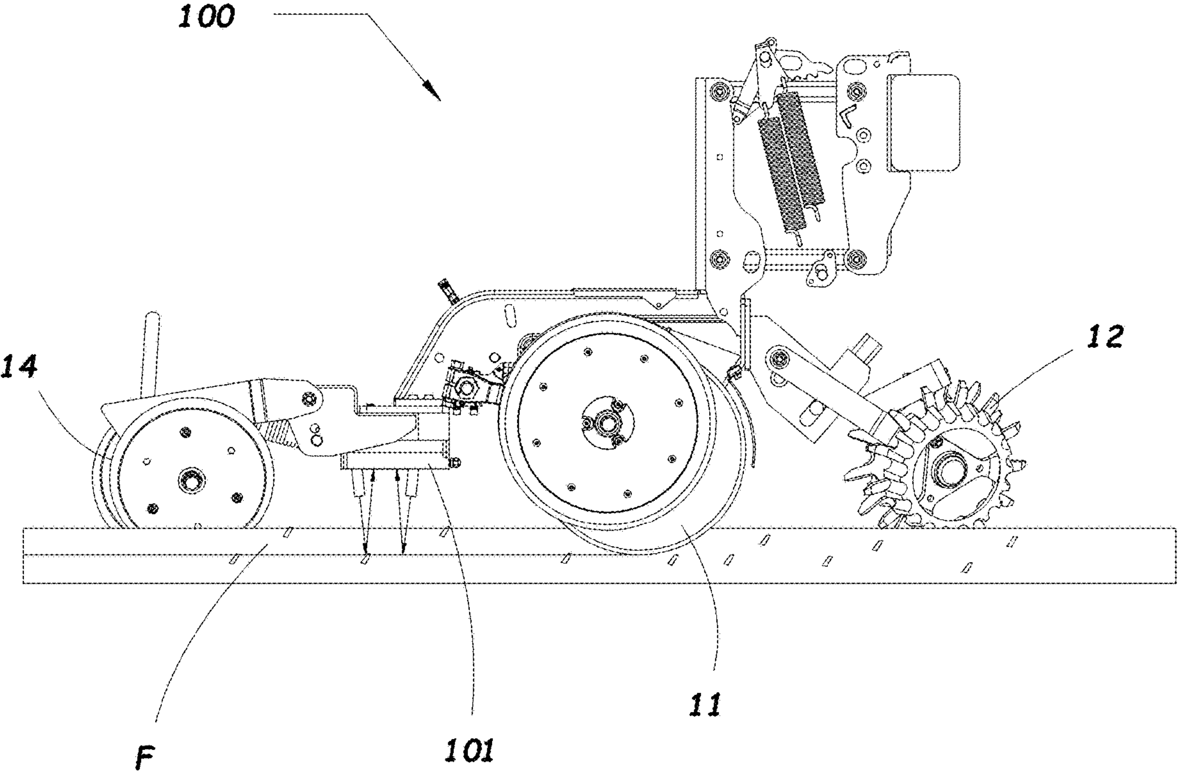
FIG. 11 is a side elevation view of a row unit with a non-contact sensor for collecting crop residue measurements behind an opener assembly.

FIG. 11 is a side elevation view of a row unit 100 according to another embodiment of the invention in which a non-contact sensor 101 is used for collecting crop residue measurements behind an opener assembly 11. The non-contact sensor 101 can be an optical sensor as in the FIG. 5 embodiment described above, but with the optical sensor tuned to detect and measure crop residue instead of soil reflectance. For example, the non-contact optical sensor 101 can be aimed to detect and measure residue in the furrow F behind the opener assembly 11, as indicated in FIG. 11. This information can used as a basis to adjust planter settings, such as the depth or down pressure on the residue clearing assemblies 12, to optimize the in-furrow planting conditions and avoid excessive residue in the seed bed.

Alternatively, the non-contact optical sensor 101 can be aimed to detect and measure crop residue outside the furrow F created by the opener assembly 11. This information can be used as a basis to adjust the operating depth or aggressiveness of the implement to leave sufficient crop residue on the field for conservation purposes. For example, the non-contact optical sensors 101 can be used to ensure sufficient crop residue remains on the field surface after planting, particularly in highly erodible areas where conservation practices require minimum residue levels to control erosion.

Figure 12:
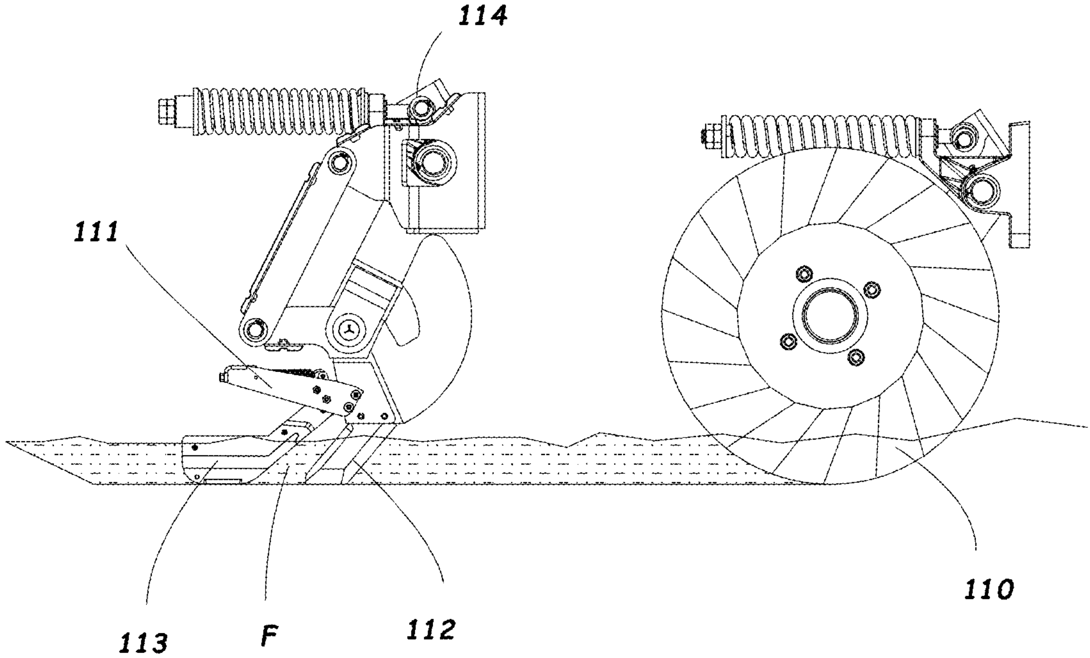
FIG. 12 is a side elevation view of an implement with a tillage blade followed by a furrow groove opener and an in-furrow sensor assembly.
Figure 13:
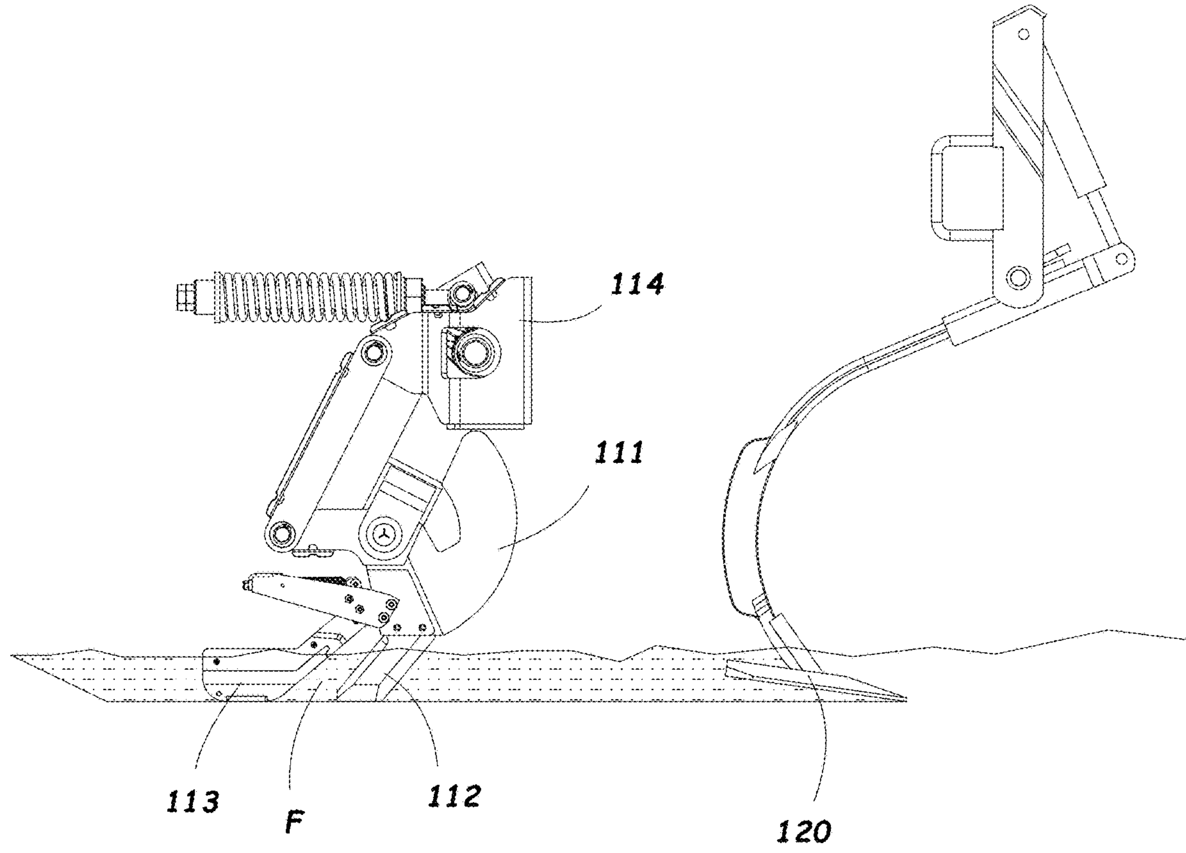
FIG. 13 is a side elevation view of an implement with a cultivator shank followed by a furrow groove opener and an in-furrow sensor assembly.

FIGS. 12 and 13 illustrate embodiments of the present invention in which in-furrow sensor assemblies are used with tillage implements. In FIG. 12, the implement includes a tillage blade 110 that creates an opening or looseness in the soil, and a sensor assembly 111 that follows behind the tillage blade 110. The sensor assembly 111 includes a furrow groove opener 112 to open a furrow F in the loose soil behind the tillage blade 110, and an in-furrow sensor module 113 that follows immediately behind the furrow groove opener 112. The sensor assembly 111 can be mounted to the implement with a universal mount parallel linkage assembly 114.

In FIG. 13, the implement includes a cultivator shank 120 that creates an opening or looseness in the soil, and a sensor assembly 111 that follows behind the cultivator shank 120. The sensor assembly 111 includes a furrow groove opener 112 to open a furrow F in the loose soil behind the cultivator shank 120, and an in-furrow sensor module 113 that follows immediately behind the furrow groove opener 112. As in the embodiment shown in FIG. 12, the sensor assembly 111 can be mounted to the implement with a universal mount parallel linkage assembly 114.

Figure 14:
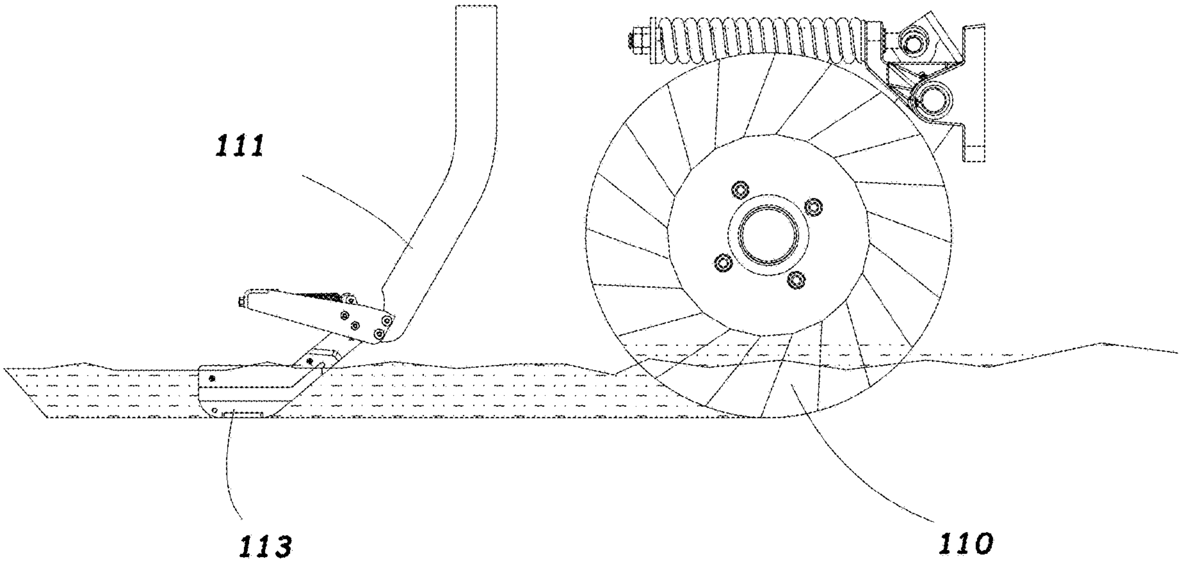
FIG. 14 is a side elevation view of an implement with a tillage blade followed by an in-furrow sensor assembly.

FIG. 14 illustrates an embodiment of the present invention in which a tillage implement has a tillage blade 110 followed by an in-furrow sensor assembly 111. The in-furrow sensor assembly 111 follows directly behind the tillage blade 110 without a secondary opener running in the loose soil behind the tillage blade 110.

The in-furrow sensor assembly 111 used in the embodiments shown in FIGS. 12 to 14 can be in the same form as the sensor modules shown in FIGS. 9 and 10. For example, the sensor assembly 111 can have a sensor module 113 with soil EC contacts and/or soil moisture contacts, soil temperature contacts, and soil optical sensors that measure properties of the exposed soil in the furrow.

Figure 15:
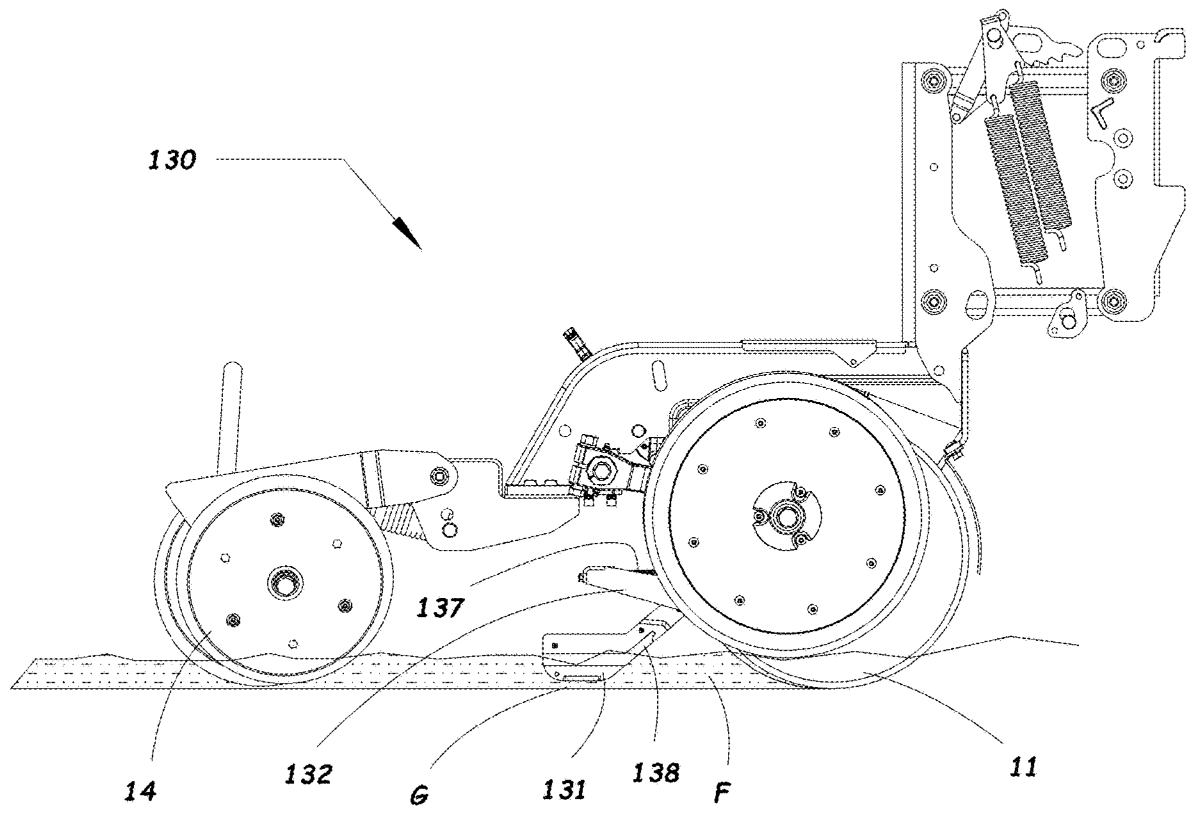
FIG. 15 is a side elevation view of an implement row unit with an opener assembly for creating a furrow, and an in-furrow sensor assembly arranged to operate in the furrow with a gap between the bottom of the sensor and the bottom of the furrow.
Figure 16:
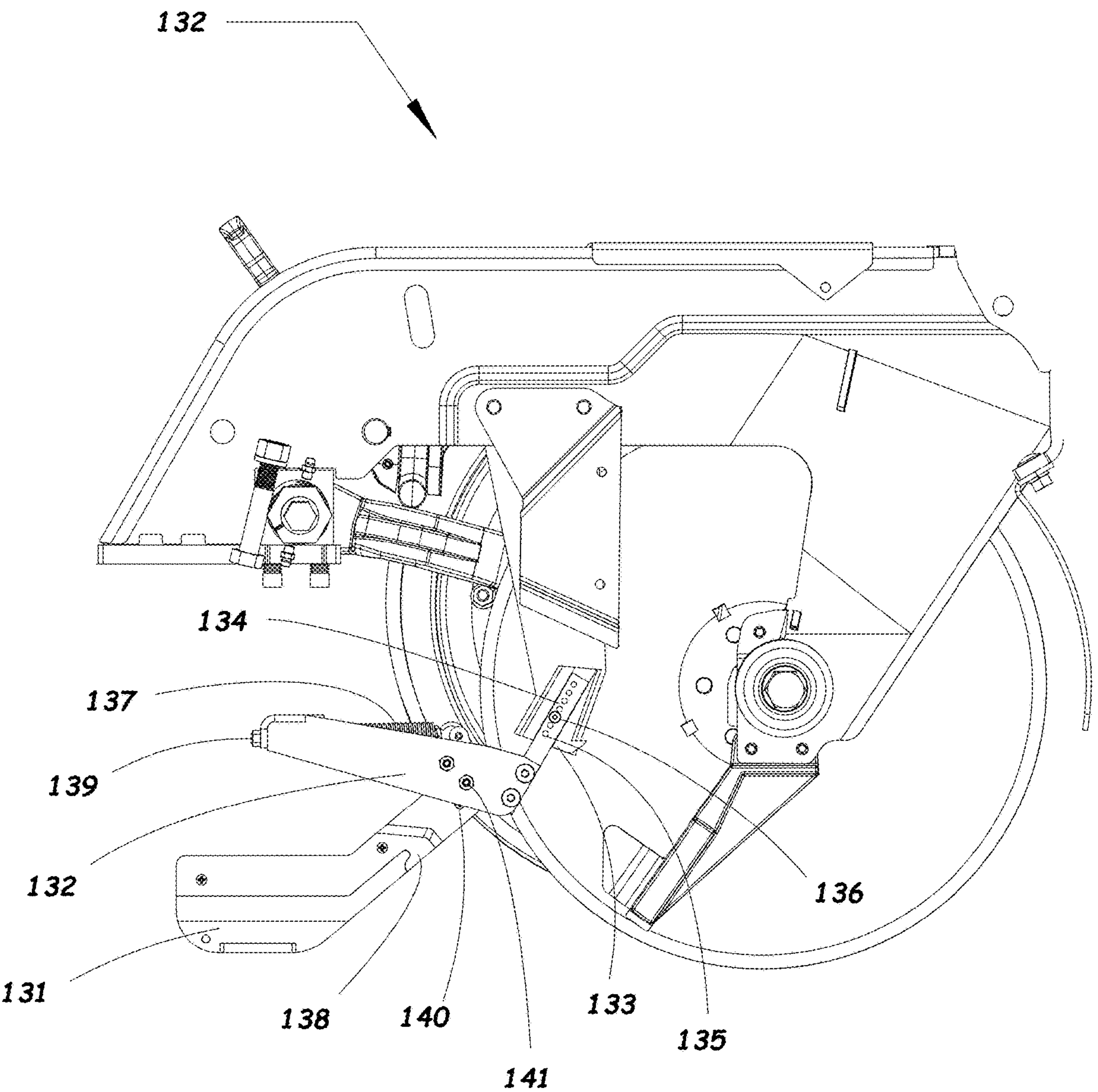
FIG. 16 is a detail view of a portion of the implement row unit shown in FIG. 15 with one of the opener blades removed to show the depth adjustment system for the in-furrow sensor assembly.

FIGS. 15 and 16 illustrate an implement row unit 130 with an opener assembly 11 for creating a furrow F, and an in-furrow sensor assembly 131 arranged to operate in the furrow F created by the opener assembly 11. The in-furrow sensor assembly 131 is mounted to operate at a controlled depth within the furrow F with a gap G between the bottom of the sensor assembly 131 and the bottom of the furrow F. This allows the in-furrow sensor assembly 131 to be used with a planter row unit, fertilizer applicator, or other implement in which contact between the sensor 131 and the bottom of the furrow F is to be prevented or minimized.

The mounting assembly 132 for the in-furrow sensor 131 includes systems for adjusting heigh (depth of operation), pressure and pitch of the sensor 131, as shown in FIG. 16. The depth adjustment system has a mounting bracket 133 and mounting arm 134 with a plurality of depth adjustment holes 135 for setting the operating depth of the in-furrow sensor 131. A pin member 136 or other suitable structure can be inserted into aligned depth adjustment holes 135 in the mounting bracket 133 and mounting arm 134 to set the operating depth.

The pressure adjustment system of the mounting assembly 132 includes an adjustable spring 137 for applying a downforce or tripping force through the sensor arm 138 for the in-furrow sensor 131. A threaded member 139 associated with the spring 137 allows the spring force to be adjusted to change the downforce or tripping force of the sensor 131.

The pitch adjustment system includes a plurality of mounting holes in the upper end 140 of the sensor arm 138 for securing the sensor arm 138 to corresponding holes in the mounting assembly 132. Pin members 141 or other suitable fasteners are inserted into the mounting holes 140 in the sensor arm 138 to secure the sensor arm 138 in a desired pitch angle. For example, the pitch angle of the sensor arm 138 can be adjusted by rotating the sensor arm 138 relative to the mounting assembly 132 so that the sensor arm 138 extends downwardly and rearwardly from the mounting assembly 132 with the bottom edge of the sensor 131 generally parallel with the bottom of the furrow F.

As in other embodiments described above, the in-furrow sensor module 131 used in the embodiment shown in FIGS. 15 and 16 can be in the same form as the sensor modules shown in FIGS. 9 and 10. For example, the sensor module 131 can have soil EC contacts and/or soil moisture contacts, soil temperature contacts, and soil optical sensors that measure properties of the exposed soil in the furrow.

Features of the present invention are disclosed and illustrated in combination with various agricultural implements, including planters, tillage implements, and fertilizer applicators. Those skilled in the art will recognize that the soil sensor assemblies disclosed herein will also have applicability to other agricultural implements, such as manure applicators, tuber harvesting machines, and the like.

While the invention has been described in connection with specific embodiments thereof, it is to be understood that this is by way of illustration and not of limitation, and the scope of the appended claims should be construed as broadly as the prior art will permit.

What is claimed is:

1. An implement for measuring soil EC, comprising:

at least one metal tine assembly having a first portion and a second portion;

said first portion having a lower end arranged to contact soil; and said second portion having a coil spring configuration for mounting to an implement through an electrically isolated support structure, said tine assembly being mounted so that said first portion can flex rearwardly to shed residue and clear obstructions by twisting the coil spring configuration of the second portion;

wherein said electrically isolated support structure is configured to electrically isolate the at least one metal tine assembly from a metal structure of the implement; and wherein the at least one metal tine assembly is electrically coupled as an electrode in an array of electrodes for measuring soil EC.

2. The implement of claim 1, wherein said electrically isolated support structure comprises:

a tubular member mounted to the implement;

at least one electrically non-conductive sleeve installed over the tubular member; and a clamp securing said second portion of the metal tine assembly to the electrically non-conductive sleeve, whereby direct metal-to-metal electrical contact between the metal tine assembly and the tubular member is prevented.

3. In combination, a planter row unit and a soil sensor, comprising:

the planter row unit comprising an opener assembly for creating a seed furrow; and the soil sensor comprising at least one flexible tine arranged behind said opener assembly, said flexible tine comprising a lower end that contacts soil in or adjacent to the seed furrow behind said opener assembly for measuring soil EC;

wherein said at least one flexible tine is electrically coupled as an electrode in an array of electrodes for measuring soil EC; and wherein said at least one flexible tine is mounted through an electrically isolated support structure configured to electrically isolate said at least one flexible tine from a metal structure of the planter row unit.

4. The combination according to claim 3, wherein said planter row unit further comprises a residue clearing assembly arranged ahead of said opener assembly to clear residue from in front of said opener assembly.

5. The combination according to claim 3, wherein said at least one flexible tine comprises first and second flexible tines mounted on a common support structure to follow behind said opener assembly, and wherein said first and second flexible tines have respective lower ends that contact soil on right and left sides of the seed furrow behind the opener assembly.

6. The combination according to claim 3, wherein said soil sensor further comprises at least one furrow sensor assembly arranged behind said opener assembly to contact the furrow, and wherein said furrow sensor assembly has at least one sensor incorporated therein for measuring a soil property selected from the group consisting of soil moisture, soil temperature, and soil organic matter.

7. The combination according to claim 3, wherein said at least one flexible tine is mounted on a support structure to follow behind said opener assembly, and said support structure comprises a first adjustment system for adjusting an angular position of said flexible tine about a lateral axis.

8. The combination according to claim 7, wherein said support structure further comprises a second adjustment system for adjusting a vertical position of the flexible tine relative to a subframe of the row unit.

9. A row crop implement comprising:

first and second row units attached to a tool bar, each row unit comprising at least one soil engaging tool and at least one soil sensor;

said soil sensor comprising at least one flexible tine arranged behind said soil engaging tool, said flexible tine comprising a lower end that contacts soil exposed by said soil engaging tool for measuring soil EC;

wherein said at least one flexible tine is electrically coupled as an electrode in an array of electrodes for measuring soil EC; and wherein said at least one flexible tine is mounted through an electrically isolated support structure configured to electrically isolate said at least one flexible tine from a metal structure of the row crop implement.

10. The row crop implement according to claim 9, wherein said soil engaging tool is an opener assembly arranged ahead of a closing wheel assembly, and said flexible tine is arranged between said opener assembly and said closing wheel assembly.

11. The row crop implement according to claim 9, wherein said soil engaging tool is a residue clearing assembly arranged ahead of an opener assembly to clear residue from in front of said opener assembly, and said flexible tine is arranged between said residue clearing assembly and said opener assembly.

12. The row crop implement according to claim 9, wherein said soil engaging tool is a coulter, and said flexible tine is arranged to follow behind said coulter.

13. The row crop implement according to claim 9, wherein each row unit further comprises at least one furrow sensor assembly arranged behind an opener assembly, and wherein said furrow sensor assembly has at least one secondary sensor incorporated therein for measuring a soil property selected from the group consisting of soil moisture, soil temperature, and soil organic matter.

14. The row crop implement according to claim 9, wherein said at least one flexible tine comprises a pair of flexible tines mounted on a common support structure of each row unit, and wherein said first and second flexible tines have respective lower ends that contact soil on right and left sides of the soil exposed by the soil engaging tool of the respective row unit.

15. The row crop implement according to claim 14, wherein said soil engaging tool is an opener assembly arranged ahead of a closing wheel assembly, and said first and second flexible tines are arranged between the opener assembly and the closing wheel assembly.

16. The row crop implement according to claim 14, wherein said soil engaging tool is a residue clearing assembly arranged ahead of an opener assembly to clear residue from in front of the opener assembly, and said first and second flexible tines are arranged between said residue clearing assembly and said opener assembly.

17. The row crop implement according to claim 14, wherein the first and second flexible tines of said first row unit are aligned with the first and second flexible tines of said second row unit to form a four electrode array for measuring soil EC.

18. The row crop implement according to claim 17, wherein said first row unit further comprises a first furrow sensor assembly having a secondary sensor incorporated therein for measuring a soil property selected from the group consisting of soil moisture and soil temperature.

19. The row crop implement according to claim 18, wherein said second row unit further comprises a second furrow sensor assembly having a secondary sensor incorporated therein for measuring soil organic matter.

20. The row crop implement according to claim 9, further comprising third and fourth row units attached to the tool bar, each of the third and fourth row units comprising at least one soil engaging tool and at least one soil sensor, and said at least one soil sensor of said third and fourth row units comprising a flexible tine arranged behind a respective one of the soil engaging tools of said third and fourth row units, and wherein the flexible tines of said first, second, third and fourth row units are aligned with each other to form a four electrode array for measuring soil EC.

21. The row crop implement according to claim 20, wherein said first row unit further comprises a first furrow sensor assembly having a secondary sensor incorporated therein for measuring a soil property selected from the group consisting of soil moisture and soil temperature.

22. The row crop implement according to claim 21, wherein said second row unit further comprises a second furrow sensor assembly having a secondary sensor incorporated therein for measuring soil organic matter.

23. The row crop implement according to claim 9, wherein said first row unit further comprises a non-contact optical sensor for measuring a soil property, said non-contact optical sensor being arranged to measure reflectance of soil exposed by said soil engaging tool.

24. The row crop implement according to claim 23, wherein said first row unit comprises an opener assembly arranged ahead of a closing wheel assembly, and said non-contact optical sensor is arranged to measure reflectance of soil exposed by the opener assembly before the soil is closed by the closing wheel assembly.

* * * * *